Sept. 29, 1959    R. E. HOFSTRA    2,906,181
MODULAR CAMERA POD
Filed Jan. 16, 1958
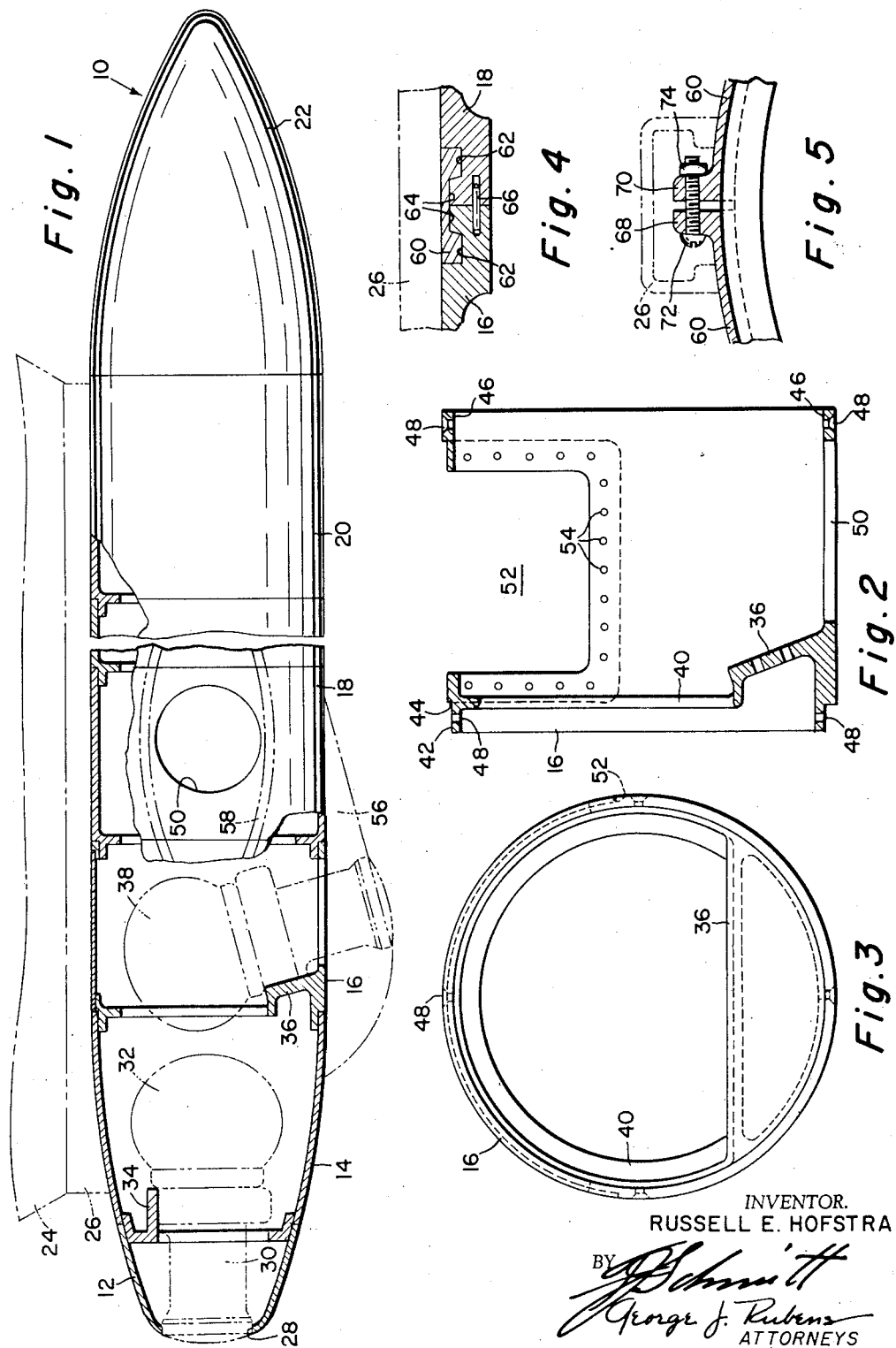
INVENTOR.
RUSSELL E. HOFSTRA

United States Patent Office 2,906,181
Patented Sept. 29, 1959

2,906,181

MODULAR CAMERA POD

Russell E. Hofstra, Oxnard, Calif.

Application January 16, 1958, Serial No. 709,428

6 Claims. (Cl. 95—12.5)

(Granted under Title 35, U.S. Code (1952), sec. 266)

The invention described herein may be manufactured and used by or for the Government of the United States of America for governmental purposes without the payment of any royalties thereon or therefor.

The present invention relates in general to aerial photography. More particularly, it relates to a camera housing or pod especially adapted for mounting on an aircraft, and which is characterized by its flexibility of design, ruggedness, and low cost of manufacture.

Automatically - operated and/or remotely - controlled cameras are extensively used on both manned aircraft and target drones to record information which is to be subsequently evaluated. During performance tests, for example, this information may comprise data indicating the flight path and "miss-distance" of a target-seeking missile. To cover a desirably wide field of view, several differently-oriented cameras are frequently mounted in an aerodynamically-contoured pod which is customarily positioned below, and supported by, one wing of the "target" aircraft. One camera is usually located in the nose of this pod, while the others may be angularly disposed about its longitudinal axis, or otherwise directed to best obtain the information desired.

These camera pods are customarily constructed by the same techniques employed in the manufacture of the aircraft itself—that is, they incorporate a framework of formed bulkheads and stringers covered by a skin made up of aluminum sheets riveted in place. The cameras are respectively mounted on brackets integrally built into the framework, so that, if a new camera position is desired, it becomes necessary to redesign and at least partially rebuild the entire pod.

Such a mode of construction results in high per unit cost when the camera pods are required in any appreciable quantity. It is true that little or no tooling is necessary, but this is only because each unit must be almost entirely handmade, and hence the total cost per pod does not appreciably decline even with a marked increase in the number manufactured.

A further disadvantage of such unitary construction is that if one portion of the pod is broken or damaged it becomes necessary to at least partially rebuild the entire structure. In addition, a pod designed to incorporate a given number of cameras is obviously incapable of accommodating an extra camera even under emergency conditions. Still further, the angular position, or lens orientation, of each camera is determined by the position of its mounting bracket, and the latter cannot be altered after assembly without subjecting the pod to major reconstruction.

Summing up, therefore, presently-known camera pods possess the disadvantages of high cost, lack of operational flexibility, and difficulty of component repair or replacement. The present invention overcomes these drawbacks by applying to a camera pod the basic principles of modular design. In other words, applicant has extended to such a structure the concept of sectional standardization through interchangeable subassemblies capable of being economically mass-produced.

In accordance with one preferred embodiment, the camera pod is built up of a number of modules, or units, in the form of shells rather than skeletal structures. These shells may, for example, comprise magnesium-die-castings. Each module is intended to contain some functional unit of the pod, such as a camera, the flotation material (if present), or the parachute recovery apparatus.

One object of the present invention, therefore, is to provide a camera pod of modular design.

Another object of the invention is to provide a camera pod arrangement, especially adapted for use on high-speed aircraft, which permits complete interchangeability of cameras while at the same time maintaining their selected optical alignments under the most adverse operating conditions.

A further object of the invention is to provide a multi-unit camera pod assembly in which damage to one unit of the assembly may be remedied by convenient removal and replacement of the component portion so damaged.

Other objects and many of the attendant advantages of this invention will be readily appreciated as the same becomes better understood by reference to the following detailed description when considered in connection with the accompanying drawings wherein:

Fig. 1 is a longitudinal view, partly in cross-section, of a preferred form of camera pod constructed in accordance with the principles of the present invention;

Fig. 2 is a detailed view of one of the modules of Fig. 1;

Fig. 3 is an end view of a complete pod unit such as shown in Fig. 2; and

Figs. 4 and 5 are cross-sectional views of an alternative mechanism for interlocking the camera modules of Fig. 1.

Referring now to the preferred embodiment of the invention illustrated in Figs. 1, 2, and 3 of the drawings, there is depicted a camera pod generally indicated by the reference numeral 10. In accordance with a principal feature of the present disclosure, this pod 10 is made up of a series of modules each of which performs a single specific function. For example, the illustrated pod includes a nose cover 12, a nose camera module 14, two aft camera modules 16 and 18, a flotation module 20 filled wth a material having a high degree of buoyancy, and a parachute section 22 to facilitate recovery of the camera pod after the latter is released from the aircraft on which it is mounted. Obviously, however, the number and function of the modules forms no part of the present invention, and as few as two such units are practicable. There is likewise no limit on the maximum number which may be so associated, such number being determined primarily by operating requirements.

The camera pod 10 is preferably suspended from the undersurface of one of the wings 24 of an aircraft (not shown). The pod 10 is secured to the wing 24 through an elongated adaptor 26, the latter being associated with a selective release mechanism (not shown) which forms part of the recovery apparatus. Such apparatus detaches the camera pod from the aircraft wing 24 and subsequently releases the parachute contained in module 22. This recovery means, however, is known in the art and forms no part of the present invention. It need only be employed in situations where the aircraft is used as a target, and hence subjected to destruction or serious damage as a result of the testing operation.

The streamlined nose cover 12 is provided with an axially-aligned aperture 28 dimensioned to receive the lens 30 of a camera 32, the latter being horizontally supported from a bracket 34 which is an inwardly-extending integral part of the shell constituting the nose camera module 14. The camera may be of conventional design and hence has been illustrated by broken lines in the drawing. It is preferably attached to bracket 34 by a plurality of bolts (not shown). It will be noted that the support surface of bracket 34 lies essentially parallel to the longitudinal axis of the camera pod, and hence camera 32 is so aligned optically as to encompass a field of view directly ahead of the camera pod 10.

In a similar manner, each of the two illustrated aft camera modules 16 and 18 incorporates a camera oriented to cover a field of view which is of particular value or interest in the testing operation being conducted. The module 16, for example, has an integrally-formed bracket 36 on which camera 38 is supported, while module 18 is identical thereto except for the matter of camera alignment. By a suitable choice of bracket angle and rotational position about the longitudinal axis of the pod, different environmental conditions and areas of activity may be photographically recorded.

The aft camera module 22 may contain a parachute which is automatically released after destruction of, or damage to, the aircraft carrying the camera pod. To facilitate recovery of the latter when the salvage operation takes place over water, the module 20 may be filled with a material of high buoyancy in order to ensure that the assembly will float until recovered.

Each of the "intermediate" modules (such as 16, 18, and 20) is of generally tubular configuration with a constant outer diameter. Hence, such modules are completely interchangeable in the sense that one or more may be omitted, or other modules added as desired. For example, a selected camera module may be replaced by another having its camera differently oriented, or some apparatus other than a camera (such as a telemetering circuit) may be substituted.

A representative interchangeable module or pod unit is illustrated in Figs. 2 and 3, unit 16 being selected for purposes of description. It is preferably a die-casting of some material such as magnesium, and in essence is a shell-like tubular structure having an internal flange 40 which forms an extension of the camera bracket 36 (see Fig. 2). The member 36 thus serves as a reinforcing element in addition to its primary function as a camera support.

The interchangeability of such modules as that in Figs. 2 and 3 is made possible by the design of the mating flanges so that such flanges overlap one another as best shown in Fig. 1. For this purpose, an annular recess is formed in the outer surface of each module (such as 42 in Fig. 2) to create a shoulder 44 between such recessed portion and the remaining outer surface of the module. The depth of this recess is approximately equal to the over-all shell thickness, and such design is made possible by increasing such thickness in the vicinity of the flange 40. It will thus be seen that one inner rim surface of any such interchangeable module (such as the surface 46 in Fig. 2) has a diameter approximately equal to the outer diameter of the annular recess 42 formed in any other interchangeable module. A sliding fit is thus made possible, and a plurality of angularly-related threaded openings 48 on the two rims of each module allow for a plurality of possible orientations for the cameras about the longitudinal axis of the pod. Such a design furthermore produces a flush outer surface between adjacent pods, thus retaining high aerodynamic efficiency.

Each of the aft camera modules such as 16 and 18 has an opening through which projects the camera lens barrel. The opening 50 in the module 16 (Fig. 2) is illustrative of this feature. To permit insertion of a camera (such as 38) into the module so that it may be secured to the bracket 36, an access hole 52 is provided diametrically opposite to the opening 50. This access hole has the shape best shown by Figs. 2 and 3—that is, it has two edges essentially parallel to the axis of the camera pod and two edges lying in planes essentially perpendicular thereto. The outer surface of the pod is recessed in a band around the periphery of the access hole (the location of which band is indicated by the broken lines) so that a cover plate (not shown) may be utilized. The latter is secured in place by a plurality of screws receivable in openings 54. Due to the recess surrounding the access hole 52, the cover plate lies flush with the outer surface of the pod.

To prevent excessive air drag and the possible formation of shock fronts at high speeds, the projecting lens barrels of the aft camera pods are respectively enclosed with streamlined airfoils, such as those indicated by the reference numbers 56 and 58. However, since these airfoils form no part of the present invention, they have been shown in the drawing in dotted outline. In practice they are customarily filled with the same type of flotation material as that which fills the module 20, thus increasing the buoyancy of the assembly during recovery operations at sea.

It will now be appreciated that the number of possible angular positions of each camera module depends upon the number of screw openings provided. As an example, if twelve such openings are present, it is possible to advance the lens orientation through successive 30° angles by removing and replacing the screws associated with such module. Furthermore, the extreme rigidity made possible by the die-cast construction, and by the large number of points secured by the screws, ensures that the respective fields of view of the various cameras will be effectively complementary even after such an angular rotation has been carried out. It is only necessary to remove the airfoil attaching means from at least one of two adjacent modules during any relative angular re-positioning of these units.

Although adjacent ones of such interchangeable modules as 16 and 18 have been illustrated as being interlocked by means of a plurality of screws insertable in the openings 48, it will be appreciated that other types of securing devices may be substituted therefor if desired. For example, the two modules to be joined may have threaded mating surfaces, with one unit being screwed into tight engagement with the other and then locked. Another alternative is shown in Figs. 4 and 5, and consists of a flexible band 60, of some material such as spring steel, extending circumferentially around the camera pod between each adjacent pair of modules. Instead of a recessed surface portion 42 forming a shoulder 44 as in the construction of Figs. 1, 2, and 3, the modification of Figs. 4 and 5 makes use of a recess in each of the two adjacent surfaces, each such recess having a deep portion 62 and a shallow portion 64, the latter two portions being contiguous as illustrated. To fit these recesses, the band 60 is roughly M-shaped in cross-section, as best shown in Fig. 4. Consequently, when the band 60 is in place, no relative longitudinal movement between the modules can occur due to the surface discontinuity between recesses 62 and 64. A plurality of pins 66 (only one of which is shown) prevents the modules from undergoing any relative rotation with respect to one another.

To secure the band 60 in position, each end of the band is provided with an extending portion 68 and 70, respectively, aligned openings are formed in these portions 68 and 70, and a threaded bolt 72 extends therethrough to engage a nut 74. When tightened by relative rotation between nut and bolt, band 60 is drawn into recesses 62 and 64 to securely bind together the two modules 16 and 18. It will be noted that the band-tightening assembly 68, 70, 72, and 74 may be contained as a unit within the adaptor rail 26 (Fig. 5) and hence need not have any adverse effect on the aerodynamic properties of the camera pod.

Apart from the strength and extreme rigidity of modules which are fabricated in accordance with the teachings of the present invention, it is possible to die-cast or mold all contoured surfaces and openings so that no machining of parts is necessary, thus still further reducing manufacturing costs. When lower initial expense is coupled with ease of repair and/or replacement, the advantages of such a mode of construction becomes apparent. No stockpile of complete camera pods is necessary, since a damaged module can be quickly and easily replaced with a new segment without rebuilding the entire mechanism, and, similarly, a new camera can replace an inoperative or defective unit in a matter of minutes, with proper optical alignment being assured.

Obviously many modifications and variations of the present invention are possible in the light of the above teachings. It is therefore to be understood that within the scope of the appended claims the invention may be practiced otherwise than as specifically described.

I claim:

1. An elongated camera pod of roughly cylindrical configuration designed to be carried by an aircraft for the purpose of simultaneously recording information present within a plurality of fields of view, said camera pod containing a plurality of cameras each of which is oriented to encompass one of the said fields of view, said camera pod being composed of a plurality of modules with selected ones of said plurality of cameras being respectively mounted within and supported by a single one of said plurality of modules, said modules being assembled in end-to-end fashion along a longitudinal axis so as to form an enclosure for said cameras, and means for permitting the selective angular rotation about such longitudinal axis of any selected one of said modules with respect to the remaining ones of said modules, thereby to cause the camera associated with said selected one module to encompass a different field of view from that covered prior to such rotation.

2. A camera pod of rotary-symmetrical configuration designed to be carried by an aircraft for the purpose of simultaneously recording information present within a plurality of fields of view, said camera pod containing a plurality of cameras each of which is oriented to encompass one of the said fields of view, said camera pod being composed of a plurality of modules with selected ones of said plurality of cameras being respectively mounted within and supported by a single one of said plurality of modules, said modules being assembled in end-to-end fashion along the axis of symmetry of said camera pod so as to form an enclosure for said cameras, with at least a portion of said plurality of modules being interchangeable with one another thereby to permit a selective variation in the number of modules comprising said plurality.

3. An aerodynamically-contoured camera pod designed to be carried by an aircraft for the purpose of obtaining information present with a plurality of fields of view, said camera pod containing a plurality of cameras each of which is oriented to encompass one of the said fields of view, said camera pod being composed of a plurality of rotary-symmetrical modular units of generally tubular shape, with selected ones of said plurality of cameras being respectively mounted within and supported by a single one of said plurality of modular units, said modular units being assembled in end-to-end fashion along their axis of symmetry so as to form an enclosure for said plurality of cameras.

4. A camera pod according to claim 3, further comprising means for securing together said assembled modular units in such fashion as to permit a selective angular rotation of any one modular unit with respect to the remaining ones of such units.

5. A camera pod according to claim 4, in which said securing means includes an annular depression in the outer surface of each modular unit adjacent one edge thereof, the inner surface of the modular unit of the camera pod assembly adjacent to such one edge being adapted to overlie such depressed annular surface portion, and securing means for the two modular units passing through the two surface portions thus related.

6. A camera pod in accordance with claim 4, in which said securing means comprises at least one flexible band encircling contiguous portions of the outer surfaces of two adjoining modular units, such contiguous outer surface portions being recessed to accommodate said flexible band, and means for tightening said band to ensure its retention in said recessed surface portions.

References Cited in the file of this patent

UNITED STATES PATENTS 2,512,486    Craig et al. _____ June 20, 1956

OTHER REFERENCES

British Journal of Photography, vol. 103, number 5020, August 3, 1956, pages 374 and 378.